Patented Sept. 12, 1933

1,926,575

UNITED STATES PATENT OFFICE 1,926,575

PRODUCTION OF ACETALDEHYDE

Friedrich Zobel and Martin Luther, Mannheim, Germany, assignor to I. G. Farbenindustrie Aktiengesellschaft, Frankfort - on - the - Main, Germany No Drawing. Application January 3, 1930, Serial No. 418,404, and in Germany January 12, 1929

17 Claims. (Cl. 260—138)

The present invention relates to the production of acetaldehyde.

We have found that the catalytic hydration of acetylene to acetaldehyde, which by the employment of aluminium oxide as the catalyst gives only small yields, can be performed in a very advantageous manner by contacting a mixture of acetylene and steam while heating with aluminium oxide which has been activated by adding thereto metallic substances having a dehydrogenating action in processes of dehydrogenating organic substances. Catalysts have been found suitable for example which consist of alumina which may have a vitreous or nonvitreous surface and with which is incorporated one or more substances which are dehydrogenation catalysts, such as the compounds of heavy metals with metalloids of the fifth and sixth group of the periodic system, as for example the oxides, sulphides, selenides, phosphides and the like, and/or the heavy metals themselves of groups 1 and 3 of the periodic system or other compounds of heavy metals such as chromates, molybdates, tungstates or phosphates and the like as such or in admixture with each other. Particularly suitable substances of the aforesaid nature are for example the compounds of the metals of the second group of the periodic system such as cadmium, or zinc, oxides or sulphides or mixtures thereof with each other or with chromates, tungstates or molybdates or anhydrides of these acids as for example $ZnO$—$WO_3$, cadmium molybdate, $ZnO$—$MoO_3$, zinc tungstate, phosphate or chromate. Particularly high yields are obtained for example with $ZnO$—$WO_3$—$Al_2O_3$—$ZnMoO_3$—$Al_2O_3$, zinc tungstate—$Al_2O_3$ or zinc phosphate—$Al_2O_3$, the oxides being usually more efficient than the sulphides. The temperatures of working are generally between 150° and 500° C., a temperature between 250° and 400° C. being usually applied.

The said catalysts have in particular the advantage that they are readily accessible and that they are characterized by great resistance to poisoning and by high efficiency. For example at from 350° to 400° centigrade practically half of the acetylene employed is converted into acetaldehyde. Even in the presence of a small excess of steam, side reactions do not occur, or only occur to a very small extent. By working in a cycle, from 80 to 90 per cent of the theoretical yield of pure acetaldehyde is readily obtainable without further treatment. The acetylene can be employed in a highly concentrated or also diluted form, e. g. in mixture with hydrogen, nitrogen, ethylene, carbon dioxide and the like.

The following examples will further illustrate the nature of this invention but the invention is not restricted to these examples.

Example 1

Each 500 grams of a catalyst which has been obtained by precipitating each 6.5 grams of nickel oxide (NiO) from a nickel sulphate solution onto each 500 grams of aluminium oxide ($Al_2O_3$) with subsequent washing and drying, are applied onto 5 times by weight of the mass of pumice stone. A mixture of 400 liters of acetylene and 2000 grams of steam per hour is then led over this catalyst at a temperature of 400° centigrade. 115 grams of acetaldehyde per hour are formed from the said quantity of gases and may be recovered by washing out or by strong cooling. By replacing nickel oxide by a double quantity thereof of cobalt oxide (CoO) 200 grams of acetaldehyde are obtained per hour from the said quantity of initial gases.

Example 2

Each 500 grams of a mass consisting of aluminium oxide ($Al_2O_3$) and containing 1.5 per cent by weight of the aluminium oxide of copper sulphide (CuS), which is mixed with from 1000 to 1500 grams of pumice stone, yields 130 grams of acetaldehyde per hour by passing thereover each 100 liters per hour of a mixture of acetylene and steam in a ratio of 1 to 4 at a temperature of 400° centigrade. By activating the alumina with 3 per cent its weight of cobalt sulphide (CoS) and passing each 400 liters of acetylene and 1200 grams of steam per hour over the catalytic mass prepared from the alumina activated in the aforesaid manner 148 grams of acetaldehyde are obtained per hour.

Example 3

Each 500 grams of precipitated and calcined alumina are stirred with a solution of 50 grams of zinc sulphate ($ZnSO_4$), and the zinc is precipitated by means of ammonium sulphide (($NH_4$)$_2$S) while stirring. The mass obtained after washing, filtering off by suction and drying is applied 5 times its weight onto pumice stone. By passing 2400 liters per hour of a mixture which contains acetylene and steam in the ratio of 1 to 5 over the catalyst thus prepared, 100 grams of acetaldehyde per hour are obtained even at a temperature of 350° centigrade. The catalyst has a long working life. Similar good results are obtained when the zinc sulphide (ZnS) is replaced by cadmium or iron sulphides (CdS or FeS).

Example 4

By passing 400 liters of acetylene and 1800 grams of steam each per hour at 400° centigrade over each 500 grams of alumina applied onto pumice stone and which has been activated with 12.5 grams of cobalt selenide (CoSe), 140 grams of acetaldehyde per hour are obtained. Under the same conditions the purest aluminium oxide ($Al_2O_3$) only yields 50 grams of acetaldehyde per hour, and soon becomes inactive.

Example 5

Each 500 grams of alumina which has been mixed with 1.2 per cent its weight of copper oxide (CuO) are deposited on each 1500 grams of pumice granules. The mass obtained is then treated with hydrogen for 5 hours at 350° to 400° C. A mixture of steam and acetylene in the ratio of 4 to 1 volumes is passed at 400° C. over the catalytic mass whereby 150 grams of acetaldehyde are obtained per hour, i. e. a yield of 40 per cent of the theoretical yield calculated on the acetylene. By replacing the copper oxide (CuO) by cobalt oxide (CoO) the yield decreases but by substituting nickel for the copper oxide 100 grams of acetaldehyde are obtained from each 1000 liters of the gases per hour at a temperature as low as 300° C.

Example 6

Each 500 grams of a mixture of 97 per cent by weight of alumina and 3 per cent by weight of zinc oxide (ZnO) are intimately mixed with each 1500 grams of pumice and 2000 liters of a mixture of 1 part of acetylene and 4 parts of steam are passed per hour over each batch of the aforesaid catalytic mass at 400° C. Almost 200 grams of acetaldehyde are obtained per hour. The zinc oxide may be replaced by the same quantity of cadmium oxide (CdO) or by one third of the zinc oxide of copper oxide (CuO).

Example 7

400 grams of aluminium oxide and 100 grams of zinc phosphate ($Zn_3(PO_4)_2$) are mixed with 1000 grams of pumice. 300 liters of acetylene and 1200 grams of steam are then passed at from 360° to 370° C. per hour over the aforesaid catalytic mass. The yield of acetaldehyde is 175 grams per hour which corresponds to a yield of 33 per cent of the acetylene employed. Similar good results are obtained when the zinc phosphate is replaced by cadmium phosphate ($Cd_3(PO_4)_2$).

Example 8

115 grams of cadmium tungstate ($CdWO_4$) are mixed with 385 grams of aluminium oxide and deposited on 1500 grams of pumice granules whereupon 400 liters of acetylene and 1600 grams of steam are passed per hour and at from 350° to 360° C. over the said catalytic mass. The yield is 190 grams of an acetaldehyde. When the cadmium tungstate is replaced by an equal amount of zinc tungstate ($ZnWO_4$), 60 per cent of the acetylene are converted into acetaldehyde which is obtained in a quantity of 430 grams per hour.

Example 9

500 grams of a catalyst consisting of 0.6 part by weight of zinc oxide (ZnO), 1 part of tungsten oxide ($WO_3$) and 8 parts of aluminium oxide ($Al_2O_3$) are deposited on 2000 grams of pumice whereupon 600 liters of acetylene and 1200 grams of steam are passed per hour and at about 350° C. over the catalytic mass. 379 grams of acetaldehyde are obtained per hour which may be collected as an aqueous solution. By returning the acetylene, which has not been converted in a single operation, over the catalytic mass again after adding thereto fresh acetylene and steam, 90 per cent of the acetylene can be converted into acetaldehyde. Similar results can be obtained with catalytic masses the active constituents of which consist of $ZnO$—$MoO_3$—$Al_2O_3$, $ZnO$—$ZnS$—$WO_3$—$Al_2O_3$, $CdO$—$MoO_3$—$Al_2O_3$, $CdO$—$WO_3$—$Al_2O_3$, $ZnO$—$Cr_2O_3$—$WO_3$—$Al_2O_3$, zinc chromate—$Al_2O_3$ ($ZnCrO_4.Al_2O_3$), cadmium chromate—$Al_2O_3$ ($CdCrO_4.Al_2O_3$) and the like.

What we claim is:—

1. The process for the production of acetaldehyde which comprises contacting a mixture containing acetylene and steam, while heating, with a catalytic substance comprising anhydrous aluminium oxide activated by a substance comprising a solid, heavy metal, said substance having a dehydrogenating action on organic substances.

2. The process for the production of acetaldehyde which comprises contacting a mixture containing acetylene and steam, while heating, with a catalytic substance comprising anhydrous aluminium oxide activated by a compound of a solid, heavy metal which compound has a dehydrogenating action on organic substances.

3. The process for the production of acetaldehyde which comprises contacting a mixture containing acetylene and steam, while heating, with a catalytic substance comprising anhydrous aluminium oxide activated by a compound of solid, heavy metal with a metalloid of the sixth group of the periodic system which compound has a dehydrogenating action on organic substances.

4. The process for the production of acetaldehyde which comprises contacting a mixture containing acetylene and steam, while heating, with a catalytic substance comprising anhydrous aluminium oxide activated by a compound of a solid, heavy metal, which compound has a dehydrogenating action on organic substances, and by a heavy metal selected from groups one and eight of the periodic system.

5. The process for the production of acetaldehyde which comprises contacting a mixture containing acetylene and steam, while heating, with a catalytic substance comprising anhydrous aluminium oxide activated by a compound of a solid, heavy metal with a metalloid of the sixth group of the periodic system, which compound has a dehydrogenating action on organic substances, and by a heavy metal selected from groups one and eight of the periodic system.

6. The process for the production of acetaldehyde which comprises contacting a mixture containing acetylene and steam, while heating, with a catalytic substance comprising anhydrous aluminium oxide activated by a compound of the solid, heavy metals of the second group of the periodic system with a metalloid of the sixth group of the periodic system, which compound has a dehydrogenating action on organic substances.

7. The process for the production of acetaldehyde which comprises contacting a mixture containing acetylene and steam, while heating, with a catalytic substance comprising anhydrous aluminium oxide activated by a sulphide of a solid, heavy metal which sulphide has a dehydrogenating action on organic substances.

8. The process for the production of acetaldehyde which comprises contacting a mixture containing acetylene and steam, while heating, with a catalytic substance comprising anhydrous aluminium oxide activated by a tungstic compound of a solid heavy metal of the second group of the periodic system.

9. The process for the production of acetaldehyde which comprises contacting a mixture containing acetylene and steam, while heating, with a catalytic substance comprising anhydrous aluminium oxide activated by a compound of a solid, heavy metal with an acid selected from the group consisting of tungstic, molybdic and chromic acids.

10. The process for the production of acetaldehyde which comprises contacting a mixture containing acetylene and steam, while heating, with a catalytic substance comprising anhydrous aluminium oxide activated by a compound of a solid, heavy metal of the second group with an acid selected from the group consisting of tungstic, molybdic and chromic acids.

11. The process for the production of acetaldehyde which comprises contacting a mixture containing acetylene and steam, while heating, with a catalytic substance comprising anhydrous aluminium oxide activated by a compound of zinc, which compound has a dehydrogenating action on organic substances.

12. The process for the production of acetaldehyde which comprises contacting a mixture containing acetylene and steam, while heating, with a catalytic substance comprising anhydrous aluminium oxide activated by a compound of zinc with a metalloid of the sixth group of the periodic system, which compound has a dehydrogenating action on organic substances.

13. The process for the production of acetaldehyde which comprises contacting a mixture containing acetylene and steam, while heating, with a catalytic substance comprising anhydrous aluminium oxide activated by zinc oxide.

14. The process for the production of acetaldehyde which comprises contacting a mixture containing acetylene and steam, while heating at between 150° and 500° C., with a catalytic substance comprising anhydrous aluminium oxide activated by a substance comprising a solid, heavy metal, said substance having a dehydrogenating action on organic substances.

15. The process for the production of acetaldehyde which comprises contacting a mixture containing acetylene and steam, while heating, at between 250° and 400° C., with a catalytic substance comprising anhydrous aluminium oxide activated by a compound of a solid heavy metal of the second group of the periodic system with an acid selected from the group consisting of tungstic, molybdic and chromic acids.

16. The process for the production of acetaldehyde which comprises contacting a mixture containing acetylene and steam, while heating, with a catalytic substance comprising anhydrous aluminium oxide activated by zinc tungstate.

17. The process for the production of acetaldehyde which comprises contacting a mixture containing acetylene and steam, while heating at between 250° and 400° C., with a catalytic substance comprising anhydrous aluminium oxide activated by zinc tungstate.

FRIEDRICH ZOBEL.
MARTIN LUTHER.